US006790876B2

(12) United States Patent
Moens et al.

(10) Patent No.: US 6,790,876 B2
(45) Date of Patent: Sep. 14, 2004

(54) RADIATION CURABLE POWDER COMPOSITIONS

(75) Inventors: Luc Moens, Sint-Genesius-Rode (BE); Kris Buysens, Oudenaard (BE); Nele Knoops, Brussels (BE); Daniel Maetens, Brussels (BE)

(73) Assignee: UCB, S.A., Brussels (BE)

(*) Notice: Subject to any disclaimer, the term of this patent is extended or adjusted under 35 U.S.C. 154(b) by 112 days.

(21) Appl. No.: 10/203,301

(22) PCT Filed: Feb. 6, 2001

(86) PCT No.: PCT/EP01/01261
§ 371 (c)(1),
(2), (4) Date: Oct. 4, 2002

(87) PCT Pub. No.: WO01/59021
PCT Pub. Date: Aug. 16, 2001

(65) Prior Publication Data
US 2003/0158285 A1 Aug. 21, 2003

(30) Foreign Application Priority Data
Feb. 9, 2000 (EP) ............................................ 00102704

(51) Int. Cl.$^7$ .................. B32B 27/06; C08F 2/46; C08F 2/48; C08J 7/04
(52) U.S. Cl. ................. 522/109; 522/111; 522/112; 427/508; 427/512; 428/480; 428/482; 428/500
(58) Field of Search ................... 522/109, 110, 522/112; 427/508, 512; 428/480, 482, 500

(56) References Cited

U.S. PATENT DOCUMENTS 6,380,279 B1 * 4/2002 Moens et al. ............... 522/111
6,384,102 B1 * 5/2002 Moens et al. ............... 522/110

FOREIGN PATENT DOCUMENTS

| DE | 43 43 885 | 6/1995 |
| EP | 0 102 312 | 3/1984 |
| EP | 0 385 779 | 9/1990 |
| EP | 0 702 040 | 3/1996 |
| WO | 98/18862 | 5/1998 |

* cited by examiner

*Primary Examiner*—Nathan M. Nutter
(74) *Attorney, Agent, or Firm*—Wenderoth, Lind & Ponack, LLP

(57) ABSTRACT

Powder compositions hardenable by radiation usable for preparing paints or varnishes, specific amorphous polyesters which are comprised within these powder compositions, the use of the paints or varnishes comprising the powder compositions for coating an article as well as articles coated with the hardened paints or varnishes are disclosed. The powder compositions of the invention are especially suited for coating over metal and heat-sensitive substrates and combine, upon melting at low temperatures and curing by radiation, a series of properties such as good flow and film hardness along with an outstanding solvent resistance.

17 Claims, No Drawings

RADIATION CURABLE POWDER COMPOSITIONS

The present invention concerns powder compositions hardenable by radiation usable for preparing paints or varnishes, specific amorphous polyesters which are comprised within these powder compositions, the use of the paints or varnishes comprising the powder compositions for coating an article as well as articles coated with the hardened paints or varnishes of the present invention. The powder compositions of the present invention are especially suited for coating over metal and heat-sensitive substrates and combine, upon melting at low temperatures and curing by radiation, a series of properties such as good flow and film hardness along with an outstanding solvent resistance.

Powder coatings, which are dry, finely divided, free flowing, solid materials at room temperature, have gained considerable popularity in recent years over liquid coatings. Despite their many advantages, nowadays thermosetting powder coatings generally are cured at temperatures of at least 150° C. Below this recommended temperature the coatings have poor appearance as well as poor physical and chemical properties. In consequence of this restriction, powder coatings are generally not employed in coating heat-sensitive substrates such as wood and plastic or assembled metallic parts containing heat-sensitive components. Heat-sensitive substrates or components both demand low curing temperatures, preferably below 140° C., to avoid significant degradation and/or deformation.

Low temperature UV-curable powders have recently been proposed as a solution to this problem.

The use of unsaturated resins, eventually in combination with unsaturated oligomers, as a binder for radiation curable powder coatings already is disclosed in the prior art. Specifically UV curable powder coating compositions derived from ethylenically unsaturated group containing polyesters, polyesterurethanes or epoxy resins, among others, have been illustrated.

WO 98/18862 is concerned with powder compositions hardenable by radiation usable as paint or varnish comprising a mixture of at least a semi-crystalline polyester containing methacryloyl groups and of at least an amorphous polyester containing methacryloyl groups, comprising the reaction products of glycidyl methacrylate and a semi-crystalline or amorphous polyester containing carboxyl groups.

EP-A-0 702 040 discloses a binder for powder coatings comprising solid unsaturated polyesterurethaneacrylates obtainable by reacting a di-isocyanate with an hydroxyalkyl (meth)acrylate and a hydroxyl group containing polyester.

In U.S. Pat. No. 5,565,246 a method of forming heat-resistant raised print on a substrate using a thermographic radiation-curable powder is disclosed. The radiation-curable powder comprises an acrylated epoxide preparable by the reaction of acrylic or methacrylic acids with an epoxy resin such as bisphenol A-epichlorohydrin epoxy polymer. In addition, the composition may include up to 20% acrylated urethanes prepared by the reaction of toluene diisocyanate with polyols, acrylic acid or hydroxyethyl methacrylic acid.

Radiation curable powder coatings for use as e.g. glavano resists are disclosed in EP-A-0 286 594. The synthesis of an acrylated epoxy resin derived from a bisphenol A based epoxy resin and acrylic acid is exemplified in example 4 of this document.

U.S. Pat. No. 4,129,488 discloses powder paint coatings suitable for ultraviolet curing and comprising specific spatial arrangements of ethylenically unsaturated polymers. The unsaturated polymer is a specific epoxy-polyester polymer having a molecular weight of at least about 1000 providing a suitable crystallinity to the free flowing powder. By way of comparison a powder based on a blend of an acrylated epoxy resin and a semi-crystalline acrylated polyester resin having a melting point of 120° C. is illustrated in example 4. The blends exhibited a poor surface film effect which had poor flow out and orange peel. Known radiation curable powder coatings, especially developed for those applications where an outstanding flexibility is needed, do meet the requirements for solvent resistance, as measured in the methyl ethyl ketone-rub test, yet fall short due to gloss decrease and blistering, for those tests as described below, where solvent resistance is evaluated for a paint film being saturated with solvents. These short comings exclude the nowaday UV curable coatings from being used in the furniture industry.

A typical example of such a test is the "MEK impregnation test". In this test a 10×10×5 mm felt pad is fully soaked in methyl ethyl ketone (MEK) and placed on the paint surface with a film thickness between 50 and 60 micrometers. Covered by, but not in contact with a watch glass or small Petri dish, the felt pad is kept for 1 hour in contact with the paint film. After 1 hour, the coating is evaluated by comparing the visual assessment and gloss, measured according to ASTM D523, with the initial values.

Another test enabling to quantify the solvent resistance of a solvent-saturated paint film consists in placing a 55 mm diameter absorbent cotton, fully soaked with acetone, on the paint surface and covering it with a watch glass or a small Petri dish. After a contact time of 20 seconds, the cotton is removed and the panel is allowed to dry in an air ventilated oven standing at 50° C. for 30 seconds. Thereupon the pencil hardness accordingly ASTM D3363-92A is measured and compared to the initial value (further called "the acetone test").

It is accordingly an object of the present invention to provide a powder coating composition, capable of being cured by radiation upon melting, which does not result in a coating exhibiting the above described problems. Specifically the powder coating composition should provide a paint film upon curing which exhibits an excellent solvent resistance even if saturated with solvents. Moreover, the film upon curing the powder coating composition should have an excellent combination of physical properties such as smoothness, flexibility, hardeness and resistance to yellowing.

It now has been surprisingly found that radiation curable powder coating compositions based on a binder comprising a particular mixture of at least one particular unsaturated amorphous polyester and at least one particular unsaturated polyphenoxy resin exhibit upon curing an excellent combination of physical properties such as smoothness, flexibility, hardness, resistance to yellowing, and above all an outstanding durability for the MEK impregnation test as well as the acetone test.

Thus, the present invention provides a radiation curable powder composition which comprises:

a) 10 to 90 weight percentage of at least one (meth) acryloyl group containing amorphous polyester;
 b) 10 to 60 weight percentage of at least one (meth) acryloyl group containing polyphenoxy resin; and
 c) 0 to 30 weight percentage of an ethylenically unsaturated oligomer and/or at least one (meth)acryloyl group containing semi-crystalline polyester;

each based on the total weight of the components a), b) and c).

The (meth)acryloyl group containing amorphous polyester a) in the powder composition of the present invention is e.g. obtainable from the reaction of a di-isocyanate with an hydroxyalkyl(meth)acrylate and a hydroxyl group containing polyester or from the reaction of glycidyl(meth)acrylate with a polyester containing carboxyl groups and is preferably composed of a polyacid constituent which contains at least 40 mole percentage of terephthalic acid or isophtalic acid, alone or in admixture, and of a polyol constituent which contains at least 20 mole percentage of neopentyl glycol.

The hydroxyalkyl(meth)acrylate used for reaction with the di-isocyanate in the above reaction is preferably selected from hydroxyethyl(meth)acrylate, 2- or 3-hydroxypropyl (meth)acry-late, 2-, 3- and 4-hydroxybutyl(meth)acrylate, etc. The di-isocyanate used for the reaction with the hydroxyalkyl(meth)acrylate and the hydroxyl group containing polyester in the above reaction is preferably selected from 1-isocyanato-3,3,5-trimethyl-5-isocyanatomethyl-cyclohexane (isophorondi-isocyanate, IPDI), tetramethyl-xylenedi-isocyanate (TMXDI), hexamethylenedi-isocyanate (HDI), trimethylhexamethylenedi-isocyanate, 4,4'-diisocyanatodi-cyclohexylmethane, 4,4'-di-isocyanatodiphenylmethane, these technical mixtures with 2,4-di-isocyanatodiphenylmethane and also the higher homologues of above mentioned di-isocyanates, 2,4-di-isocyanatotoluene and technical mixtures of them with 2,6-di-isocya-natotoluene, as well as the copolymerisation product of α,α'-dimethyl-meta-isopropenyl-benzylisocyanate (TMI).

The hydroxyl group containing polyester in the above reaction is preferably the reaction product of
1. an acid constituent which contains from 50 to 100 mole percentage of terephthalic acid or isoptalic acid, alone or in admixture, and from 0 to 50 mole percentage of at least one other saturated aliphatic, cycloaliphatic or aromatic di- or polycarboxylic acid such as phthalic anhydride, 1,4-cyclohexanedicarboxylic acid, 1,3-cyclohexanedicarboxylic acid, 1,2-cyclohexanedicarboxylic acid, succinic acid, adipic aid, glutaric acid, pimelic acid, suberic acid, azealic acid, sebacic acid, 1,12-dodecanedioic acid, trimellitic acid, pyromellitic acid, etc., or the corresponding anhydrides, and
2. a stoichiometric excess, on the acid constituents, of an alcohol constituent which contains from 20 to 100 mole percentage of neopentyl glycol, and from 0 to 80 mole percentage of at least one other aliphatic or cycloaliphatic di- or polyol such as ethylene glycol, propylene glycol, di-ethylene glycol, 1,4-butanediol, 1,6-hexanediol, 1,4-cyclohexanediol, 1,4-cyclohexanedimethanol, 2-methyl-1,3-propanediol, 2-butyl-2-ethyl-1,3-propanediol, hydrogenated Bisphenol A, hydroxypivalate of neopentyl glycol, trimethylolpropane, ditrimethylolpropane, pentaerythrytol, etc. Ethylene glycol is especially preferred.

The alcohol constituent of the hydroxyl group containing polyester preferably contains from 20 to 100 mole percentage of neopentyl glycol and from 0 to 80 mole percentage of ethylene glycol.

The hydroxyl group containing polyester further is preferably characterised by an hydroxyl number (OHN) ranging from 10 to 100 mg KOH/g, and particularly from 25 to 100 mg KOH/g, a number average molecular weight (Mn) from 800 to 14,000 and particularly 1,000 to 8,000, and an ICI cone/plate viscosity at 200° C. according to ASTM D4287-88 from 5 to 50,000 mPa.s.

Otherwise, when the (meth)acrylic group containing amorphous polyester a) in the powder composition of the present invention is prepared from glycidyl(meth)acrylate with a polyester containing carboxyl groups, this acid functionalised polyester is preferably obtainable from carboxylation and chain extension with a polyacid of the hydroxyl group containing polyester as specified above. The polyacid preferably used, is selected from adipic acid, isophtalic acid, 1,4-cyclohexanedicarboxylic acid, 1,3-cyclohexanedicarboxylic acid, 1,2-cyclohexanedicarboxylic acid and trimellitic acid.

The polyester containing carboxyl groups thus obtained, is further preferably characterised by an acid number (AN) ranging from 10 to 80 mg KOH/g, and particularly from 20 to 70 mg KOH/g, a number average molecular weight (Mn) from 800 to 15,000, and particularly from 1,000 to 8,500, and an ICI cone/plate viscosity at 200° C. according to ASTM D4287-88 from 10 to 50,000 mPa.s.

The amorphous polyesters containing (meth)acryloyl groups a) incorporated in the compositions in accordance with the present invention preferably exhibit a degree of unsaturation of 0.15 to 1.80, particularly of 0.35 to 1.25 milliequivalents of double bounds per gram of polyester, and in a specifically preferred embodiment additionally exhibit the following characteristics:
- a number average molecular weight (Mn) from 1,100 to 16,000, preferably between 1,300 and 8,500, measured by gel permeation chromatography (GPC);
- a glass transition temperature (Tg) determined by differential scanning calorimetry (DSC) according to ASTM D3418-82, from 35 to 80° C.; and
- a viscosity in the molten state measured at 200° C. with a cone/plate viscometer (known under the name of ICI viscosity) according to ASTM D4287-88, from 1 to 20,000 mPa.s.

For the preparation of the amorphous polyesters containing hydroxyl and/or carboxyl groups, use is generally made of a conventional reactor equipped with a stirrer, an inert gas (nitrogen) inlet, a distillation column connected to a water-cooled condenser and a thermometer connected to a thermoregulator.

The esterification conditions used for the preparation of these polyesters can be conventional, namely that it is possible to use an ordinary esterification catalyst e.g. derived from tin, such as dibutyltin oxide, dibutyltin dilaurate or n-dibutyltin trioctoate, or derived from titanium, such as tetrabutyl titanate, in the proportion of e.g. 0 to 1% by weight of the reactants, and optionally to add antioxidants, such as the phenol compounds Irganox 1010 (Ciba) or Ionol CP (Shell) or stabilisers of phosphonite or phosphite type, such as tributyl phosphite or triphenyl phosphite, in the proportion of e.g. 0 to 1% by weight of the reactants.

The polyesterification is generally carried out at a temperature which is gradually increased from 130 to approximately 180 to 250° C., first at normal pressure and then under reduced pressure at the end of each step of the process, these conditions being maintained until a polyester is obtained which exhibits the desired hydroxyl and/or acid number. The degree of esterification is monitored by determination of the amount of water formed during the reaction and of the properties of the polyester obtained, for example the hydroxyl number, the acid number, the molecular weight and/or the viscosity.

The amorphous polyesters containing (meth)acryloyl groups a) can be prepared in one of the following ways:

On completion of the above described polycondensation, the hydroxyl or carboxyl functional group containing amorphous polyester in the molten state, which is found in the reactor, is allowed to cool to a temperature between 100 and 160° C., and a radical polymerisation inhibitor, such as phenothiazine or an inhibitor of the hydroquinone type, is added in a proportion of e.g. 0.01 to 1% with respect to the weight of the polyester, and the nitrogen is replaced by an oxygen inlet.

When started from a hydroxyl group containing polyester, a substantially equivalent amount of hydroxyalkyl(meth) acrylate is added thereto. When all the hydroxyalkyl(meth) acrylate is added, an equivalent amount of di-isocyanate is slowly added to the mixture. A catalyst for the hydroxyl/ isocyanate reaction can optionally be used. Examples of such catalysts include organo-tin compounds (e.g. dibutyltin dilaurate, dibutyltin dimaleate, dibutyltin oxide, stannous octoate, 1,3-diacetoxy-1,1,3,3-tetrabutyl-distanoxane). These catalysts are preferably used in an amount of 0 to 1% with respect to the weight of the polyester.

Otherwise, when started from a polyester containing carboxyl groups, a substantially equivalent amount of glycidyl(meth)acrylate is added thereto. A catalyst for the acid/epoxy reaction can optionally be used. Examples of such catalysts include amines (e.g. 2-phenylimidazoline), phosphines (e.g. triphenylphosphine), ammonium salts (e.g. tetrabutylammonium bromide or tetrapropylammonium chloride), phosphonium salts (e.g. ethyltriphenylphosphonium bromide or tetrapropylphosphonium chloride). These catalysts are preferably used in an amount of 0.05 to 1% with respect to the weight of the polyester.

The degree of progression of the reaction is monitored by determination of the properties of the polyester obtained, for example the hydroxyl number, the acid number, the degree of unsaturation and/or the content of free glycidyl-(meth) acrylate or hydoxyalkyl(meth)acrylate.

The (meth)acryloyl group containing polyphenoxy resin b) in the compositions of the present invention is obtainable from the reaction of (meth)acrylic acid with a glycidyl group containing polyphenoxy resin such as the Bisphenol A based epoxy resins or the phenol or cresol epoxy novolacs.

The Bisphenol A based epoxy resins can be prepared from the reaction of Bisphenol A and epichlorohydrin, wherein the excess of epichlorohydrin determines the number average molecular weight of the epoxy resin (W. G. Potter: Epoxide Resins, Springer-Verlag, New York 1970; Y. Tanaka et al. (eds.): Epoxy Resins Chemistry and Technology, Marcel Dekker, New York 1973, Chapter 2, pp. 9–134). The phenol and cresol epoxy novolacs can be prepared by the acid-catalysed condensation of formaldehyde with either phenol or cresol. Epoxidation of the novolacs with epichlorohydrin furnishes the epoxy novolacs. Commercially available epoxy resins, such as Epikote 1055 from Shell, Araldite GT7004 or Araldite ECN9699 from Ciba, D.E.R.664 from Dow, etc., are typical examples of glycidyl group containing polyphenoxy resins that can be utihsed for the preparation of the (meth)acryloyl group containing polyphenoxy resin b).

For the preparation of the (meth)acryloyl group containing polyphenoxy resin b), use is generally made of a conventional reactor equipped with a stirrer, an inlet for oxygen, an inlet for (meth)acrylic acid and a thermometer connected to a thermoregulator. To the epoxy resin standing at a temperature between 100 and 150° C., a radical polymerisation inhibitor is added in a proportion of e.g. 0.01 to 1% with respect to the weight of the epoxy resin. A substantial equivalent amount of (meth)acrylic acid is than slowly added to the molten epoxy resin. A catalyst for the acid/epoxy reaction can optionally be used. Examples of such catalysts include amines (e.g. 2-phenylimidazoline), phosphines (e.g. triphenylphosphine), ammonium salts (e.g. tetrabutylammonium bromide or tetrapropylammonium chloride), phosphonium salts (e.g. ethyltriphenylphosphonium bromide or tetrapropylphosphonium chloride). These catalysts are preferably used in an amount of 0.05 to 1% with respect to the weight of the epoxy resin.

The degree of progression of the reaction is monitored by determination of the properties of the (meth)acryloyl group containing polyphenoxy resin obtained, such as acid number, hydroxyl number and the degree of unsaturation.

The (meth)acryloyl group containing polyphenoxy resins b) incorporated in the compositions in accordance with the present invention, preferably exhibit a degree of unsaturation of 0.2 to 6.0, particularly of 0.5 to 4.5 milliequivalents of double bounds per gram of resin, and in a specifically preferred embodiment additionally exhibit the following characteristics:

- a number average molecular weight (Mn) from 500 to 5,000, preferably between 650 and 3,500, measured by gel permeation chromatography (GPC);
- a glass transition temperature (Tg) determined by differential scanning calorimetry (DSC) according to ASTM D3418-82, from 30 to 80° C.; and
- a viscosity in the molten state measured at 200° C. with a cone/plate viscometer (known under the name of ICI viscosity) according to ASTM D4287-88, from 1 to 25,000 mPa.s.

According to a preferred embodiment of the invention, the radiation-curable powder compositions additionally comprise an ethylenically unsaturated oligomer and/or at least one (meth)acrylic group containing semi-crystalline polyester c).

As examples of these ethylenically unsaturated oligomers, mention will be made, of the triacrylate and the tri(meth) acrylate of tris(2-hydroxyethyl)isocyanurate, the epoxy acrylates and methacrylates which are formed by the reaction of an epoxy compound (for example, the diglycidyl ether of Bisphenol A) with acrylic or methacrylic acid, the urethane acrylates and methacrylates which are formed by the reaction of an organic di- or polyisocyanate with an hydroxyalkylacrylate or a hydroxyalkylmethacrylate and optionally a mono- and/or polyhydroxylated alcohol (for example, the reaction product of hydroxyethyl(meth) acrylate with toluenedi-isocyanate or isophoronedi-isocyanate), the acrylic acrylates or methacrylates, such as, for example, the reaction product of (meth)acrylic acid with a copolymer containing glycidyl groups obtained by copolymerisation of acrylic monomers, such as n-butylmethacrylate and methylmethacrylate, and the like.

The semi-crystalline polyesters that can be added to the radiation curable powder composition of the present invention are obtainable from the reaction of a di-isocyanate with an hydroxyalkyl(meth)acrylate and a hydroxyl group containing semi-crystalline polyester or from reaction of glycidyl(meth)acrylate with a semi-crystalline polyester containing carboxyl groups accordingly a procedure as for the amorphous unsaturated polyesters described above.

The semi-crystalline hydroxyl or carboxyl group containing polyesters can preferably be the reaction product of an acid constituent which contains 75 to 100 mole percentage of terephthalic acid, 1,4-cyclohexanedicarboxylic acid or a saturated straight-chain aliphatic dicarboxylic acid having 4 to 14 carbon atoms and from 0 to 25 mole percentage of at least one other aliphatic, cycloaliphatic or aromatic di- or polycarboxylic acid, and a glycol constituent which contains 75 to 100 mole percentage of 1,4-cyclohexanedimethanol, 1,4-cyclohexanediol or a saturated straight-chain aliphatic diol having 2 to 12 carbon atoms, and from 0 to 25 mole percentage of at least one other aliphatic or cycloaliphatic di- or polyol.

The semi-crystalline polyesters containing (meth)acryloyl groups optionally incorporated in the compositions in accordance with the present invention preferably exhibit a degree of unsaturation of 0.18 to 1.80, particularly of 0.35 to 1.25 milliequivalents of double bounds per gram of polyester.

In a specifically preferred embodiment, the semi-crystalline polyesters containing (meth)acryloyl groups optionally incorporated in the compositions in accordance with the present invention additionally exhibit the following characteristics:

- a number average molecular weight (mn) between 1,000 and 21,000, preferably between 1,300 and 9,000, measured by gel permeation chromatography (GPC);
- a well-defined melting point of approximately between 60 and 150° C., determined by differential scanning calorimetry (DSC) according to ASTM D3418-82; and a viscosity in the molten state of less than 10,000 mPa.s, measured at 175° C. with a cone/plate viscometer (known under the name of ICI viscosity) according to ASTM D4287-88.

As these ethylenically unsaturated oligomers and semi-crystalline polyesters contain polymerisable double bounds, they also participate in the radiation curing and can consequently provide coatings with an improved flow and a surface hardness which is further increased. Depending on the envisaged applications, the compositions in accordance with the invention can contain 0 to 20, or 2 to 10 parts by weight of ethylenically unsaturated oligomer and/or from 0 to 30, or from 5 to 20 parts by weight of at least one semi-crystalline polyester per 100 parts of compounds a), b) and c) of the composition in accordance with the invention.

The amorphous polyesters a) and the polyphenoxy resins b) containing (meth)acryloyl groups optionally along with the ethylenically unsaturated oligomer and/or the semi-crystalline polyester containing (meth)acryloyl groups c), all described above, are intended to be used as binders in the preparation of powder compositions curable by UV radiation or by accelerated electron beams, it being possible for the said compositions to be used in particular as varnishes and paints which e.g. lend themselves to application according to the technique of deposition by means of a triboelectric or electrostatic spray gun or according to the technique of deposition in a fluidised bed.

The radiation curable powder compositions can be used as varnishes or paints as such or, if desired, the compositions can be used to prepare the varnishes or paints by adding further constituents conventionally used in the preparation of powder varnishes and paints.

Therefore, the present invention also relates to the powder varnish or paint obtained using these compositions.

Finally, the present invention also relates to a process for coating an article comprising the application to the said article of a radiation curable powder composition in accordance with the invention by deposition such as by spraying with a triboelectric or electrostatic spray gun or by deposition in a fluidised bed, followed by the melting of the coating thus obtained such as by heating at a temperature of 80 to 150° C. for a time of e.g. approximately 0.5 to 10 minutes and by the curing of the coating in the molten state by UV irradiation or by accelerated electron beams.

For the radiation curing of the powder compositions in accordance with the invention with accelerated electron beams, it is not necessary to use a photo-initiator, seeing that this type of radiation provides by itself alone a production of free radicals which is sufficiently high for the curing to be extremely rapid. In contrast, when it concerns the photo-curing of the powder composition according to the invention with radiation where the wavelengths are between 200 and 600 nm (UV radiation), the presence of at least one photo-initiator is essential.

The photo-initiators which can be used according to the present invention are chosen from those commonly used for this purpose.

The appropriate photo-initiators which can be used, are aromatic carbonyl compounds, such as benzophenone and its alkylated or halogenated derivatives, anthraquinone and its derivatives, thioxanthone and its derivatives, benzoin ethers, aromatic or non-aromatic alphadiones, benzil dialkyl acetals, acetophenone derivatives and phosphine oxides.

Photo-initiators which may be suitable, are, for example, 2,2'-diethoxylacetophenone, 2-, 3- or 4-bromoacetophenone, 2,3-pentanedione, hydroxycyclohexylphenylketone, benzaldehyde, benzoin, benzophenone, 9,10-dibromoanthracene, 2-hydroxy-2-methyl-1-phenylpropan-1-one, 4,4'-dichlorobenzophenone, xanthone, thioxanthone, benzildimethylketal, diphenyl(2,4,6trimethylbenzyl)phosphine oxide, and the like. It may be optionally advantageous to use a photo-activator, such as tributylamine, 2-(2-aminoethylamino)ethanol, cyclohexylamine, diphenylamine, tribenzylamine or aminoacrylates such as, for example, the addition product of a secondary amine, such as dimethylamine, diethylamine, diethanolamine, and the like, with a polyol polyacrylate, such as the diacrylate of trimethylolpropane, 1,6-hexanediol, and the like.

The powder compositions in accordance with the invention can contain 0 to 15 and preferably 0.5 to 8 parts of photo-initiators for 100 parts by weight of the binder in the composition in accordance with the invention.

The radiation-curable powder compositions and powder varnishes or paints, respectively, in accordance with the invention can also contain various additional substances conventionally used in the manufacture of powder paints and varnishes.

The additional substances optionally added to the radiation-curable powder compositions in accordance with the invention, e.g. to prepare the powder varnishes or paints are, inter alia, compounds which absorb UV radiation, such as Tinuvin 900 (Ciba), light stabilisers based on sterically hindered amines (for example Tinuvin 144 from Ciba), fluidity-regulating agents such as Resiflow PV5 (Worlee), Modaflow (Monsanto), Acronal 4F (BASF) or Crylcoat 109 (UCB), degassing agents such as benzoin and the like.

To the radiation-curable powder composition according to the present invention, further can be added a variety of coating properties modifying substances such as polytetrafluoroethylene modified polyethylene waxes (e.g. Lanco Wax TF1830 from Lubrizol), polyethylene waxes (e.g. Ceraflour 961 from BYK Chemie), polypropylene waxes (e.g. Lanco Wax PP1362 from Lubrizol), polyamide waxes (e.g. Orgasol 3202 D NAT from ELF Atochem), organosilicones (e.g. Modarez S304P from Protex), etc., or blends of them. These modifying substances are optionally added from 0 to 10 parts for 100 parts by weight of the binder in the composition according to the invention.

A variety of pigments and inorganic fillers can also be added to the radiation curable powder compositions in accordance with the invention. Mention will be made, as examples of pigments and fillers, of metal oxides, such as titanium oxide, iron oxide, zinc oxide, and the like, metal hydroxides, metal powders, sulphides, sulphates, carbonates, silicates such as, for example, aluminium silicate, carbon black, talc, kaolins, barytes, iron blues, lead blues, organic reds, organic maroons, and the like.

These additional substances are used in the usual amounts, it being understood that if the radiation curable powder compositions in accordance with the invention are used as varnishes, the addition of additional substances having opacifying properties should be omitted.

For the preparation of the radiation curable powder compositions, the amorphous polyester containing (meth)acryloyl groups a), the (meth)acryloyl group containing polyphenoxy resin b), the ethylenically unsaturated oligomer and/or (meth)acryloyl group containing semi-crystalline polyester c), if present, optionally the photo-initiator, optionally the various additional substances conventionally used for the manufacturing of powder paints and varnishes, and optionally the coating properties modifying substances are dry mixed, for example in a tumbling mixer. The mixture is then homogenised at a temperature ranging from 60 to 150° C. in an extruder, for example a Buss Ko-Kneter single-screw extruder or a twin-screw extruder of Werner-Pfleiderer, APV-Baker or Prism type. The extrudate is then allowed to cool, is ground and sieved in order to obtain a powder in which the size of the particles is preferably between 10 and 150 μm. Instead of the above method, it is also possible to dissolve/suspend the different unsaturated constituents of the binder system of the present invention, optionally the photo-initiator, and the various additional substances in a solvent such as dichloromethane, to grind in order to obtain a homogeneous suspension containing approximately 30% by weight of solid matter and subsequently to evaporate the solvent, for example by spray drying at a temperature of approximately 50° C., according to methods known per se.

The powder paints and varnishes thus obtained, are entirely suitable for application to the article to be coated by conventional techniques, that is to say by the well-known technique of e.g. deposition in a fluidised bed or by application with a triboelectric or electrostatic spray gun.

After having been applied to the article concerned, the coatings deposited are heated e.g. in a forced circulation oven or by means of infrared lamps at a temperature of 80 to 150° C. for a time of e.g. approximately 0.5 to 10 minutes for the purpose of obtaining the melting and the spreading of the powder particles as a smooth, uniform and continuous coating at the surface of the said article. The molten coating is then cured by radiation, such as UV light emitted, for example, by medium-pressure mercury vapour UV radiators, of preferably at least 80 to 250 W/linear cm, or by any other well-known source of the state of the art, at a distance of e.g. approximately 5 to 20 cm and for a time sufficient to dure the coating, such as 1 to 60 seconds.

The molten coating can also be cured with accelerated electron beams of preferably at least 150 keV, the power of the devices employed being a direct function of the thickness of the composition layer to be cured by polymerisation.

The invention is also concerned by articles partially or enterely coated by these coating processess.

The radiation-curable powder compositions in accordance with the invention can be applied to the most diverse substrates, such as, for example, paper, cardboard, wood, fibre board, textiles, metals of different nature, plastics, such as polycarbonates, poly(meth)acrylates, polyolefins, polystyrenes, poly(vinylchloride)s, polyesters, polyurethanes, polyamides, copolymers such as acrylonitrile-butadiene-styrene (ABS) or cellulose acetate butyrate, and the like.

The examples which will follow, illustrate the invention without limiting it. Except when otherwise indicated, the parts mentioned throughout the description and in the examples are parts by weight.

EXAMPLE 1

Step 1

A mixture of 369.7 parts of neopentyl glycol, 10.2 parts of trimethylolpropane along with 2.1 parts of n-butyltin trioctoate catalyst is placed in a conventional four-neck round bottom flask.

The flask contents are heated while stirring, under nitrogen to a temperature of circa 140° C. Thereupon 528.7 parts of terephthalic acid along with 27.8 parts of adipic acid are added while stirring and the mixture is gradually heated to a temperature of 230° C. Distillation starts from about 190° C. After about 95% of the theoretical quantity of water is distilled and a transparent prepolymer is obtained, the mixture is cooled down to 200° C.

The hydroxyl functionalised prepolymer thus obtained, is characterised by:

| | |
|---|---|
| AN = | 10 mg KOH/g |
| OHN = | 51 mg KOH/g |

Step 2

To the first step prepolymer standing at 200° C., 96.5 parts of isophthalic acid are added. Thereupon the mixture is gradually heated to 225° C. After a two-hour period at 225° C. and when the reaction mixture is transparent, 0.8 parts of tributylphosphite are added and a vacuum of 50 mm Hg is gradually applied.

After 3 hours at 225° C. and 50 mm Hg, following characteristics are obtained:

| | |
|---|---|
| AN = | 37 mg KOH/g |
| OHN = | 2 mg KOH/g |
| ICI200° C. = | 5,400 mPa · s |

Step 3

The carboxyl functionalised polyester is cooled down to 150° C. and 0.9 parts of di-t-butylhydroquinone along with 4.6 parts of ethyltriphenylphosphonium bromide are added. Subsequently 77.3 parts of glycidylmethacrylate is slowly added (30 minutes) while stirring under oxygen. An hour after the addition is ended, a methacryloyl unsaturated polyester, with the following characteristics is obtained:

| | |
|---|---|
| AN = | 5 mg KOH/g |
| OHN = | 39 mg KOH/g |
| unsaturation = | 1.0 meq/g |
| $ICI^{200° C.}$ = | 3,800 mPa · s |
| $Tg^{quenched}$(DSC 20°/min) = | 56° C. |
| Mn (GPC) = | 4,000 |

EXAMPLE 2

Step 1

A mixture of 317.3 parts of neopentyl glycol, 35.3 parts of ethylene glycol and 10.3 parts of trimethylolpropane along with 1.9 parts of n-butyltin trioctoate catalyst is placed in a conventional four-neck round bottom flask as in example 1.

The flask contents are heated while stirring, under nitrogen to a temperature of circa 140° C. Thereupon 478.0 parts of terephthalic acid along with 25.2 parts of adipic acid are added while stirring and the mixture is gradually heated to a temperature of 230° C. Distillation starts from about 185° C. After about 95% of the theoretical quantity of water is distilled and a transparent prepolymer is obtained, the mixture is cooled down to 200° C.

The hydroxyl functionalised prepolymer thus obtained, is characterised by:

| | |
|---|---|
| AN = | 2 mg KOH/g |
| OHN = | 88 mg KOH/g |

Step 2

To the first step prepolymer standing at 200° C., 159.3 parts of isophthalic acid are added. Thereupon the mixture is gradually heated to 225° C. After a two-hour period at 225° C. and when the reaction mixture is transparent, 0.8 parts of tributylphosphite are added and a vacuum of 50 mm Hg is gradually applied.

After 3 hours at 225° C. and 50 mm Hg, following characteristics are obtained:

| | |
|---|---|
| AN = | 47 mg KOH/g |
| OHN = | 2.5 mg KOH/g |
| $ICI^{200° C.}$ = | 2,700 mPa · s |

Step 3

The carboxyl functionalised polyester is cooled down to 150° C. and 1.3 parts of di-t-butylhydroquinone along with 4.4 parts of ethyltriphenylphosphonium bromide are added. Subsequently 106.8 parts of glycidylmethacrylate is slowly added (30 minutes) while stirring under oxygen. An hour after the addition is ended, a methacryloyl unsaturated polyester, with the following characteristics is obtained:

| | |
|---|---|
| AN = | 1 mg KOH/g |
| OHN = | 50 mg KOH/g |
| unsaturation = | 0.9 meq/g |
| $ICI^{200°\ C.}$ = | 800 mPa · s |
| $Tg^{quenched}$(DSC 20°/min) = | 37° C. |
| Mn (GPC) = | 2,300 |

EXAMPLE 3

Step 1

A mixture of 154.3 parts of neopentyl glycol, 154.3 parts of ethylene glycol, 10.1 parts of trimethylolpropane along with 2.0 parts of n-butyltin trioctoate catalyst is placed in a conventional four-neck round bottom flask as in example 1.

The flask contents are heated while stirring, under nitrogen to a temperature of circa 140° C. Thereupon 629.9 parts of terephthalic acid are added while stirring and the mixture is gradually heated to a temperature of 230° C. Distillation starts from about 190° C. After about 95% of the theoretical quantity of water is distilled and a transparent prepolymer is obtained, the mixture is cooled down to 200° C.

The hydroxyl functionalised prepolymer thus obtained, is characterised by:

| | |
|---|---|
| AN = | 5 mg KOH/g |
| OHN = | 39 mg KOH/g |
| unsaturation = | 0.6 meq/g |
| $ICI^{200°\ C.}$ = | 4,500 mPa · s |
| $Tg^{quenched}$(DSC 20°/min) = | 60° C. |
| Mn(GPC) = | 4,100 |

Step 2

To the first step prepolymer standing at 200° C., 94.5 parts of isophthalic acid are added. Thereupon the mixture is gradually heated to 225° C. After a two-hour period at 225° C. and when the reaction mixture is transparent, 0.8 parts of tributylphosphite are added and a vacuum of 50 mm Hg is gradually applied.

After 3 hours at 225° C. and 50 mm Hg, following characteristics are obtained:

| | |
|---|---|
| AN = | 9 mg KOH/g |
| OHN = | 48 mg KOH/g |

Step 3

The carboxyl functionalised polyester is cooled down to 160° C. and 0.9 parts of di-t-butylhydroquinone along with 4.5 parts of ethyltriphenylphosphonium bromide are added. Subsequently 75.7 parts of glycidylmethacrylate is slowly added (30 minutes) while stirring under oxygen. An hour after the addition is ended, a methacryloyl unsaturated polyester, with the following characteristics is obtained:

| | |
|---|---|
| AN = | 35 mg KOH/g |
| OHN = | 2 mg KOH/g |
| $ICI^{200°\ C.}$ = | 8,300 mPa · s |

Step 4

The methacryloyl group containing polyester subsequently is heated to 170° C. At this temperature 20.0 parts of Lanco® Wax TF 1830 are added while stirring. Half an hour after the addition is completed, the reactor is emptied while stirring is continued.

EXAMPLE 4

Step 1

A mixture of 369.5 parts of neopentyl glycol along with 1.9 parts of n-butyltin trioctoate catalyst is placed in a conventional four-neck round bottom flask as in example 1. The flask contents are heated while stirring, under nitrogen to a temperature of circa 140° C. Thereupon 531.3 parts of terephthalic acid are added while stirring and the mixture is gradually heated to a temperature of 230° C. Distillation starts from about 190° C. After about 95% of the theoretical quantity of water is distilled and a transparent prepolymer is obtained, the mixture is cooled down to 150° C.

The hydroxyl functionalised prepolymer thus obtained, is characterised by:

| | |
|---|---|
| AN = | 6 mg KOH/g |
| OHN = | 53 mg KOH/g |

Step 2

The hydroxyl functionalised polyester prepolymer is cooled down to 150° C. and 1.1 parts of di-t-butylhydroquinone are added. Subsequently 91.3 parts of hydroxyethylacrylate is slowly added (10 minutes) while stirring under oxygen. Once the addition completed, 120.0 parts of toluenedi-isocyanate are slowly added while keeping the temperature at 150° C. An hour after the addition is ended, a acryloyl unsaturated polyesterurethane, with the following characteristics is obtained:

| | |
|---|---|
| AN = | 1 mg KOH/g |
| OHN = | 3 mg KOH/g |
| unsaturation = | 0.9 meq/g |
| $ICI^{200°\ C.}$ = | 5,800 mP · s |
| $Tg^{quenched}$(DSC 20°/min) = | 53° C. |
| Mn (GPC) = | 2,240 |

EXAMPLE 5

In a conventional four-neck round bottom flask equipped with a stirrer, an inlet for oxygen, an inlet for (meth)acrylic acid and a thermocouple attached to a thermoregulator, 910 parts of Araldite GT7004 (a Bisphenol-A-polyphenoxy resin, with a EEW of 715–750 and a softening point of 95–101° C.) are heated under oxygen to a temperature of 140° C. Subsequently 0.8 parts of ethyltriphenylphosphonium bromide are added and the addition of 90 parts of acrylic acid containing 0.2 parts of di-t-butylhydroquinone, is started. The acrylic acid addition is completed in a 3 hour period. One and an half hour after the completion of the acrylic acid addition, a resin with the following characteristics is obtained:

| | |
|---|---|
| AN = | 7 mg KOH/g |
| unsaturation = | 1.24 meq/g |
| ICI$^{200° C.}$ = | 700 mP · s |
| Tg$^{quenched}$(DSC 20°/min) = | 49° C. |
| Mn (GPC) = | 1,650 |

EXAMPLE 6

In a similar way as in example 5,957 parts of Araldite GT7077 (a Bisphenol-A-polyphenoxy resin with a EEW of 1515–1665 and a softening point of 125–135° C.) are reacted with 43 parts of acrylic acid containing 0.2 parts of di-t-butylhydroquinone, is started. The reaction is catalysed through the addition of 0.8 parts of ethyltriphenylphosphonium bromide. A resin with the following characteristics is obtained:

| | |
|---|---|
| AN = | 5 mg KOH/g |
| unsaturation = | 0.63 meq/g |
| ICI$^{200° C.}$ = | 2,700 mP · s |
| Tg$^{quenched}$(DSC 20°/min) = | 55° C. |
| Mn (GPC) = | 3,320 |

EXAMPLE 7

Synthesis of a semi-crystalline polyester containing methacryloyl groups.

Step 1

502.3 parts of 1,4-cyclohexanedimethanol, 545.0 parts of adipic acid and 4.5 parts of dibutyltin oxide, as catalyst, are introduced into a four necked round bottom flask as in example 1. The mixture is heated in a nitrogen atmosphere and with stirring to a temperature of approximately 140° C., at which the water formed begins to distil. The heating is then continued gradually until the reaction mass reaches the temperature of 220° C. When the distillation at atmospheric pressure stops, a vacuum of 50 mm Hg is gradually established. The reaction is then continued for 3 hours at 220° C. under a pressure of 50 mm Hg.

The semi-crystalline polyester containing carboxyl groups thus obtained, exhibits the following characteristics:

| | |
|---|---|
| AN = | 30.5 mg KOH/g |
| OHN = | 2 mg KOH/g |
| ICI$^{175° C.}$ = | 3,500 mPa · s |

Step 2

The polyester containing carboxyl groups obtained in the first step is allowed to cool beforehand to the temperature of 140° C., and 0.9 parts of di-t-butylhydroquinone along with 4.6 parts of ethyltriphenylphosphonium bromide are added. Subsequently 70 parts of glycidylmethacrylate are slowly added while stirring under oxygen.

A semi-crystalline polyester containing methacryloyl groups is obtained which exhibits the following characteristics:

| | |
|---|---|
| AN = | 1.7 mg KOH/g |
| OHN = | 31 mg KOH/g |
| unsaturation = | 0.5 meq/g |
| ICI$^{175° C.}$ = | 3,600 mP · s |
| Tm$^{quenched}$(DSC 20°/min) = | 80° C. |
| Mn (GPC) = | 4,025 |

EXAMPLE 8

Synthesis of an Urethanemethacrylate Oligomer

In a conventional four neck round bottom flask, equipped with a stirrer, an inlet for oxygen, an inlet for hydroxyethylmethacrylate and a thermocouple attached to a thermoregulator, 391 parts of hexamethylenedi-isocyanate and 0.15 parts of dibutyltindilaurate are heated under oxygen to 70° C. Subsequently 606 parts of hydroxyethylmethacrylate containing 0.2 parts of di-t-butylhydroquinone, are slowly added in about 4 hours. When the addition is completed, the temperature is increased to 90° C. and another 0.2 parts of di-t-butylhydroquinone are added. After an additional one hour stirring a white crystalline oligomer with following characteristics is obtained:

| | |
|---|---|
| OHN = | 6 mg KOH/g |
| unsaturation = | 4.7 meq/g |
| ICI$^{100° C.}$ = | 130 mP · s |
| Tg$^{quenched}$(DSC 20°/min) = | 66° C. |
| Mn (GPC) = | 428 |

EXAMPLE 9

Preparation of Radiation Curable Powder Coating Compositions

A series of white powders, which can be used for the manufacturing of coatings by spraying with the aid of an electrostatic spray gun, is prepared from blends of the amorphous polyesters and the epoxy resins containing (meth)acryloyl groups optionally in combination with the ethylenically unsaturated oligomer and/or the semi-crystalline polyester containing (meth)acryloyl groups in accordance with the present invention, and by way of comparison from methacryloyl group containing amorphous polyesters or from acryloyl group containing epoxy resins used as such, the formulation of these powders being as follows:

| | |
|---|---|
| binder | 750.0 parts |
| titanium dioxide (Kronos 2310 (Kronos)) | 250.0 parts |
| α-hydroxyketone (Irgacure 2959(Ciba)) | 12.5 parts |
| bisacylphosphine oxide (Irgacure 819 (Ciba)) | 12.5 parts |
| fluidity regulating agent (Resiflow PV5 (Worlee Chemie)) | 10.0 parts |

These powder compositions are prepared by dry mixing the (meth)acryloyl group containing resins, the photoinitiator and the ethylenically unsaturated oligomer and/or the (meth)acryloyl group containing semi-crystalline polyester, if present, with the various additional substances conventionally used for the manufacture of powder paints and varnishes. The mixture obtained is homogenised at a temperature of approximately 70 to 140° C. in a Prism 16 mm (L/D=15/1) twin screw extruder (from the company Prism), and the extrudate is ground in a grinder of Alpine 100UPZ (from the company Alpine). To complete, the powder is sieved in order to obtain a size of the particles between 10 and 110 μm.

EXAMPLE 10

Characteristics of the Coatings

The powders formulated as described in example 9 with the blend of (meth)acryloyl group containing resins, in accordance with the present invention and with the binder systems given by way of comparison, are applied with an electrostatic spray gun at a voltage of 60 kV on medium density fibreboard (MDF) panels with a film thickness of 40 to 100 µm.

In order to have the powder deposited on the MDF panels, a copper plate connected to the ground, is put behind the panel during spraying.

The coatings deposited are then subjected to melting in a medium wavelength infrared/convection oven (Triab) at a temperature of 140° C. during a time of approximately 3 minutes, and are then subjected to irradiation with ultraviolet light emitted by a 160 W/cm Gallium-doped followed by a 160 W/cm medium-pressure mercury vapour UV-bulb (Fusion UV Systems Ltd.) with a total UV-dose of 4000 mJ/cm2. The cured coatings thus obtained are subjected to conventional tests. The results obtained are reported in table 1 which shows in:

column 1: the number of the example of the formulation;

column 2: the number of the preparation example of the unsaturated amorphous polyester and its weight percentage in the complete binder;

column 3: the number of the preparation example of the unsaturated epoxy resin and its weight percentage in the complete binder;

column 4: the additional constituent (unsaturated oligomer and/or the unsaturated semi-crystalline polyester) and its weight percentage in the complete binder;

column 5: the value of the resistance to direct impact (DI), in kg.cm, according to ASTM D2795, and the value of the reverse impact (RI), in kg.cm, according to ASTM D2795. The resistance to reverse and direct impact is measured on the coatings sprayed on untreated cold rolled steel panels and cured accordingly a curing schedule as for the MDF panels;

column 6: the resistance to MEK, which corresponds to the number of twofold rubbing movements (to and fro) with a cotton pad impregnated with MEK which does not detrimentally affect the appearance of the surface of the cured film;

column 7: the MEK impregnation test: compares initial visual assessment—initial 60° gloss to visual assessment of MEK impregnated film—60° gloss of MEK impregnated film, wherein:

the visual assessment of the coating, according to which good (g) means that the cured coating possesses a smooth and glossy appearance, without apparent defects such as craters, pinholes and the like, medium (m) means that the cured coating exhibits a slight orange peel, yet without apparent defects such as craters, pinholes and the like, poor (p) means that the cured coating exhibits a pronounced orange peel and in addition, apparent defects, and bad (b) means that the cured coating exhibits a pronounced orange peel and in addition, apparent defects, mainly blisters, and texture (t) means that the finish proves a structured aspect which is typical for kitchen/bathroom furniture applications the 60° gloss is measured accordingly ASTM D523;

column 8: the acetone test: compares the value of the pencil hardness at an angle of 45°, with a force of 7.5 N, measured according to ASTM D3363-92A of the initial paint film as such to/value of the pencil hardness at an angle of 45°, with a force of 7.5 N, measured according to ASTM D3363-92A after a 20 second saturation with acetone (acetone test);

column 9: the Yellow Index (YIE) measured according to ASTM E313, using a spectrophotometer with a C2-illuminant and a 10°-observer. For a Yellow Index value higher than 2, a yellowish to yellow aspect of the white finish is perceived. The higher the value for the Yellow Index, the more pronounced the yellowish perception.

TABLE 1

| Powder | Polyester | Epoxy | Additional components | DI/RI | MEK rubs | MEK impregnation | Acetone test | YIE |
|---|---|---|---|---|---|---|---|---|
| 11 | E1-50 | E5-50 | | 120/140 | >200 | g-89/g-87 | 2H/2H | 1.7 |
| 12 | E2-50 | E6-50 | | 80/80 | >200 | g-88/g-89 | 3H/2H | 1.8 |
| 13 | E3-70 | E5-30 | | 120/120 | >200 | t-g-90/t-g-86 | 2H/2H | 1.1 |
| 14 | E4-60 | E6-40 | | 100/100 | >200 | g-88/g-85 | 2H/H | 1.2 |
| 15 | E1-60 | E5-20 | E7-20 | 160/140 | >200 | g-90/g-86 | 2H/H | 1.3 |
| 16 | E1-40 | E5-40 | E7-20 | 120/120 | >200 | g-88/g-86 | 2H/2H | 1.5 |
| 17 | E1-20 | E5-60 | E7-20 | 120/120 | >200 | g-m-86/g-m-84 | 2H/2H | 2.5 |
| 18 | E3-50 | E6-40 | E8-10 | 140/120 | >200 | t-g-90/t-g-90 | 3H/3H | 1.6 |
| 19 | E2-90 | E5-10 | | 160/160 | >200 | g-87/g-84 | 2H/H | 0.9 |
| 20(*) | E1-100 | | | 200/200 | 140 | g-88/b-53 | H/3B | 0.5 |
| 21(*) | | E5-100 | | 120/140 | >200 | m-85/m-84 | H/H | 5.6 |
| 22(*) | | | E7-100 | 180/200 | 200 | g-90/m-b-68 | 2B/4B | 0.7 |
| 23(*) | | E5-40 | E7-60 | 120/120 | 200 | m-86/m-83 | B/B | 1.3 |
| 24 | E11-50 | E5-50 | | 80/60 | >200 | g-90/g-88 | 2H/2H | 1.4 |

(*)Comparative Examples

The results summarised in table 1 clearly show that the powder compositions in accordance with the present invention (powders 11 to 19), based on the amorphous polyesters and polyphenoxy resins containing methacryloyl groups, according to the present invention, give paints and varnishes which assess advantageous characteristics, markedly superior to those of the corresponding coatings obtained from the compositions of the state of the art (powders 20–23).

In fact it is seen for compositions of the state of the art and based on amorphous polyesters (powder 20=comparative example) that weak results are obtained, especially for the acetone test (drop in pencil hardness from H to 3B) and the MEK impregnation test (visual assessment indicating tremendous blistering and a 60° gloss reduction from 88 to 53).

From powder 21 (=comparative example) it appears that a good solvent resistance is obtained from UV-curable powder coating compositions based on acryloyl group containing polyphenoxy resins, yet an unsatisfactory flow as well as an increased yellowness (YIE=5.6) of the white coating makes them unsuitable for commercial purposes.

From powder 22 (=comparative example) it is clear, that a UV-curable powder coating composition obtained from semi-crystalline polyesters, though proving a satisfying initial visual assessment, fails for initial pencil hardness (2B) as well as for the acetone test (drop in pencil hardness from 2B to 4B) and the MEK impregnation test (visual assessment indicating some blister formation and a 60° gloss reduction from 90 to 68). From powder 23 (=comparative example) it can be seen that a satisfactory solvent resistance is obtained from a composition comprising a blend of an unsaturated semi-crystalline polyester and an unsaturated polyphenoxy resin, yet unsatisfactory initial pencil hardness (B) as well as a paint film with an initial unsatisfactory flow are observed. Comparative powders 21, 22 and 23 correspond in principle to examples 1, 3 and 4 of U.S. Pat. No. 4,129,488, respectively.

These results altogether clearly show the superiority of the powder compositions in accordance with the invention with respect to the compositions of the state of the art.

EXAMPLE 11

Step 1

A mixture of 329.0 parts of neopentyl glycol along with 2.0 parts of n-butyltin trioctoate catalyst is placed in a conventional four-neck round bottom flask as in example 1. The flask contents are heated while stirring, under nitrogen to a temperature of circa 140° C. Thereupon 571.3 parts of isophthalic acid are added while stirring and the mixture is gradually heated to a temperature of 225 C. Distillation starts from about 190° C. After a two-hour period at 225° C. and when the reaction mixture is transparent, 0.7 parts of tributylphosphite are added and a vacuum of 50 mm Hg is gradually applied.

After 3 hours at 225° C. and 50 mm Hg, following characteristics are obtained:

| | |
|---|---|
| AN = | 46 mg KOH/g |
| OHN = | 4 mg KOH/g |
| ICI175° C. = | 5700 mP · s |

Step 2

The carboxyl functionalised polyester is cooled down to 150° C. and 1.1 parts of di-t-butylhydroquinone along with 3.9 parts of ethyltriphenylphosphonium bromide are added. Subsequently 92.3 parts of glycidylmethacrylate is slowly added (30 minutes) while stirring under oxygen. An hour after the addition is ended, a methacryl unsaturated polyester, with the following characteristics is obtained:

| | |
|---|---|
| AN = | 3 mg KOH/g |
| OHN = | 39 mg KOH/g |
| unsaturation = | 0.65 meq/g |
| ICI175° C. = | 1,800 mP · s |
| Tgquenched(DSC 20°/min) = | 42° C. |
| Mn (GPC) = | 3100 |

The polyester so obtained is formulated in the powder n°24, as in Example 9, and a coating is made and tested therewith as in Example 10. The results are reported in Table 1.

What is claimed is:

1. Radiation curable powder composition which comprises:

a) 10 to 90 weight percentage of at least one (meth)acryloyl group containing amorphous polyester;

b) 10 to 60 weight percentage of at least one (meth)acryloyl group containing polyphenoxy resin; and c) 0 to 30 weight percentage of an ethylenically unsaturated oligomer and/or at least one (meth)acryloyl group containing semi-crystalline polyester;

each based on the total weight of the components a), b) and c).

2. Radiation curable powder composition according to claim 1, wherein the (meth)acryloyl group containing amorphous polyester is composed of a polyacid constituent which contains at least 40 mole percentage of terephthalic acid or isophthalic acid, alone or in admixture, and of a polyol constituent which contains at least 20 mole percentage of neopentyl glycol.

3. Radiation curable powder composition according to claim 1, wherein the (meth)acryloyl group containing amorphous polyester is obtainable from the reaction of a di-isocyanate with an hydroxyalkyl(meth)acrylate and a hydroxyl group containing polyester or from the reaction of glycidyl(meth)acrylate with a polyester containing carboxyl groups.

4. Radiation curable powder composition according to claim 3, wherein the hydroxyl group containing polyester is the reaction product of a) an acid constituent which contains from 50 to 100 mole percentage of terephthalic acid or isophthalic acid, alone or in admixture, and from 0 to 50 mole percentage of at least one other saturated aliphatic, cycloaliphatic or aromatic di- or polycarboxylic acid and b) a stoichiometric excess, on the acid constituents, of an alcohol constituent which contains from 20 to 100 mole percentage of neopentyl glycol, and from 0 to 80 mole percentage of at least one other aliphatic or cycloaliphatic di- or polyol; and the polyester containing carboxyl groups is the reaction product of the foregoing hydroxyl groups containing polyester with a polyacid.

5. Radiation curable powder composition according to claim 1, wherein the (meth)acryloyl group containing amorphous polyester has a degree of unsaturation of 0.15 to 1.80 milliequivalents of double bonds per gram of polyester, a number average molecular weight from 1,100 to 16,000 measured by gel permeation chromatography (GPC), a glass transition temperature determined by differential scanning calorimetry (DSC) according to ASTM D3418-82 from 35 to 80° C. and a viscosity in the molten state measured at 200° C. with a cone/plate viscosimeter according to ASTM D4287-88 from 1 to 20,000 mPa.s.

6. Radiation curable powder composition according to claim 1, wherein the (meth)acryloyl group containing polyphenoxy resin is the reaction product of(meth)acrylic acid with a glycidyl group containing polyphenoxy resin.

7. Radiation curable powder composition according to claim 1, wherein the (meth)acryloyl group containing polyphenoxy resin has a degree of unsaturation of 0.5 to 6.0 milliequivalents of double bonds per gram of resin, a number average molecular weight from 500 to 5,000 measured by gel permeation chromatography (GPC), a glass transition temperature determined by differential scanning calorimetry (t)SC) according to ASTM D3418-82, from 30 to 80° C. and a viscosity in the molten state measured at 200° C. with a cone/plate viscosimeter according to ASTM D4287-88 from 1 to 25,000 mPa.s.

8. Radiation curable powder composition according to claim 1, wherein the ethylenically unsaturated oligomer is an epoxy(meth)acrylate, an urethane(meth)acrylate, an acrylic(meth)acrylate or tri(meth)acrylate of tris(2-hydroxyethyl)isocyanurate.

9. Radiation curable powder composition according to claim 1, which comprises from 0 to 20 weight percentage of an ethylenically unsaturated oligomer based on the total weight of the components a), b) and c).

10. Radiation curable powder composition according to claim 1, wherein the (meth)acryloyl group containing semi-crystalline polyester has a degree of unsaturation of 0.18 to 1.80 milliequivalents of double bonds per gram of polyester, a number average molecular weight between 1,000 and 21,000, measured by gel permeation chromatography (GPC), a well-defined melting point of between 60 and 150° C., determined by differential scanning calorimetry (DSC) according to ASTM D3418-82 and a viscosity in the molten state of less than 10,000 mPa.s measured at 175° C. with a cone/plate viscosimeter according to ASTM D4287-88.

11. Radiation curable powder composition according to claim 1, which comprises from 0 to 30 weight percentage of the (meth)acryloyl group containing semi-crystalline polyester based on the total weight of the components a), b) and c).

12. Radiation curable powder composition according to claim 1, which additionally comprises up to 15 parts by weight of a photo-initiator for 100 parts by weight of the total of the amorphous polyester a), the polyphenoxy resin b) and the ethylenically unsaturated oligomer and/or semi-crystalline polyester c) and optionally a photo-activator.

13. Radiation curable powder composition according to claim 1, which additionally comprises from 0 to 10 parts by weight of at least one coating properties modifying substance for 100 parts by weight of the total of the amorphous polyester a), the polyphenoxy resin b) and the ethylenically unsaturated oligomer and/or semi-crystalline polyester c).

14. Powder varnish or powder paints comprising a radiation curable powder composition which comprises:
   a) 10 to 90 weight percentage of at least one (meth)acryloyl group containing amorphous polyester;
   b) 10 to 60 weight percentage of at least one (meth)acryloyl group containing polyphenoxy resin; and
   c) 0 to 30 weight percentage of an ethylenically unsaturated oligomer and/or at least one (meth)acryloyl group containing semi-crystalline polyester;
   each based on the total weight of the components a), b) and c).

15. Process for coating an article, wherein a radiation curable powder composition which comprises:
   a) 10 to 90 weight percentage of at least one (meth)acryloyl group containing amorphous polyester;
   b) 10 to 60 weight percentage of at least one (meth)acryloyl group containing polyphenoxy resin; and
   c) 0 to 30 weight percentage of an ethylenically unsaturated oligomer and/or at least one (meth)acryloyl group containing semi-crystalline polyester;
   each based on the total weight of the components a) b) and c),
   is deposited on the article, followed by melting the coating on the thus obtained article and by radiation curing the coating in the molten state.

16. Process according to claim 15, wherein the melting of the coating is achieved by heating the coating at a temperature of 80 to 150° C. preferably for a time of 0.5 to 10 minutes and/or the curing of the coating in the molten state is achieved by exposing the said coating to UV radiation or to accelerated electron beams for a time which is sufficient to form a cured coating.

17. Article partially or entirely coated by a process which comprises depositing radiation curable powder composition which comprises:
   a) 10 to 90 weight percentage of at least one (meth)acryloyl group containing amorphous polyester;
   b) 10 to 60 weight percentage of at least one (meth)acryloyl group containing polyphenoxy resin; and
   c) 0 to 30 weight percentage of an ethylenically unsaturated oligomer and/or at least one (meth)acryloyl group containing semi-crystalline polyester,
   each based on the total weight of the components a), b) and c) on an article, followed by melting the coating on the article and by radiation curing the coating in the molten state.

* * * * *